Nov. 27, 1956  R. DEIBEL  2,771,784
ADJUSTABLE SNAP ACTION MECHANISM
Filed March 2, 1953  2 Sheets-Sheet 1
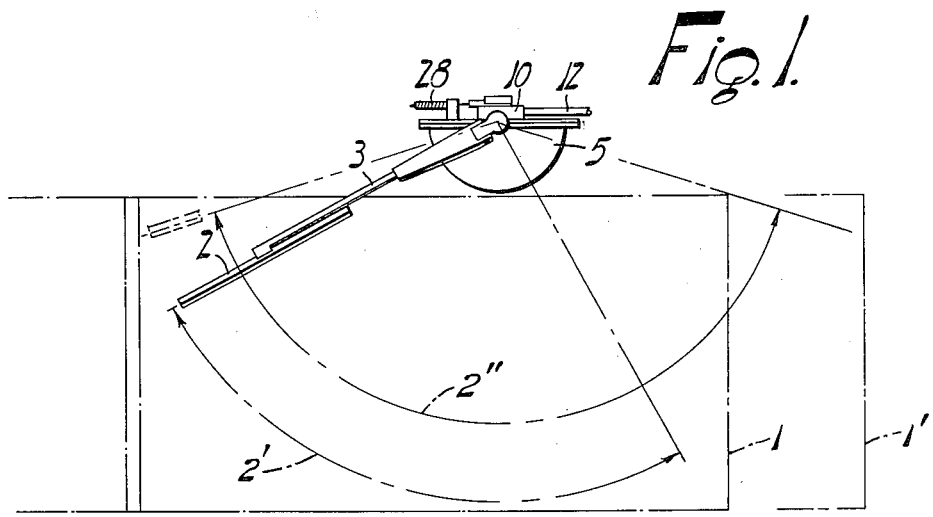
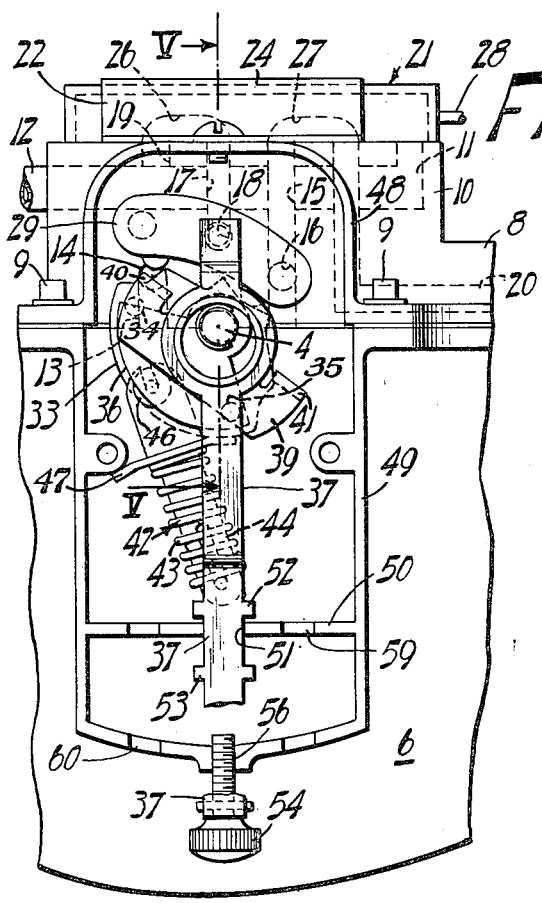
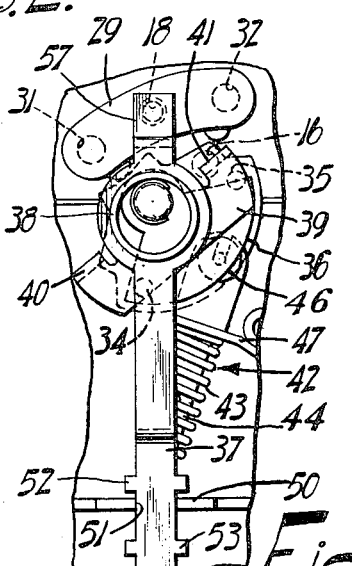
INVENTOR.
RAYMOND DEIBEL
BY
Bean, Brooks, Buckley & Bean
ATTORNEYS Nov. 27, 1956  R. DEIBEL  2,771,784
ADJUSTABLE SNAP ACTION MECHANISM
Filed March 2, 1953  2 Sheets-Sheet 2
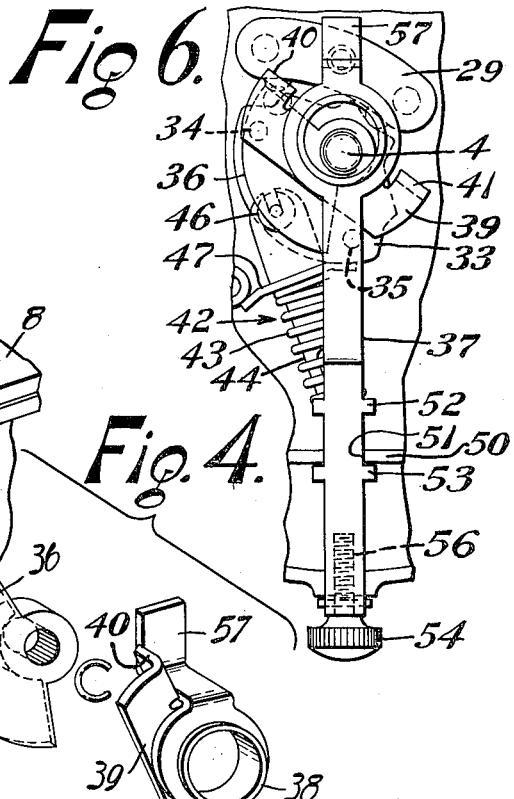
Fig. 6.
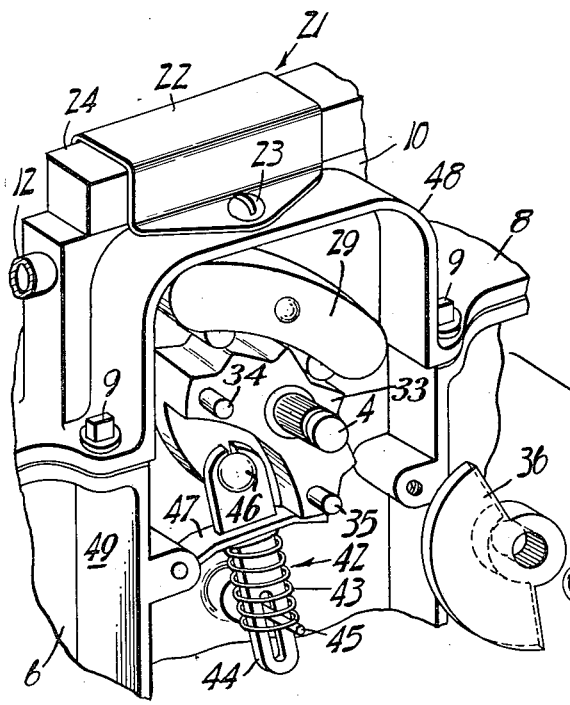
Fig. 4.
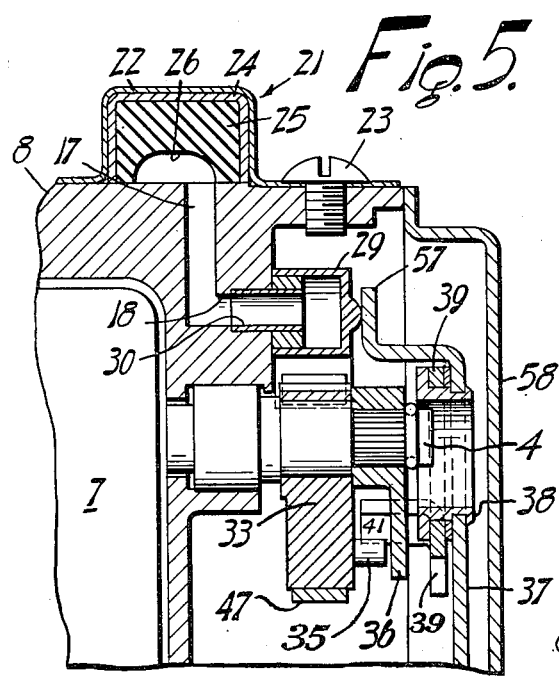
Fig. 5.
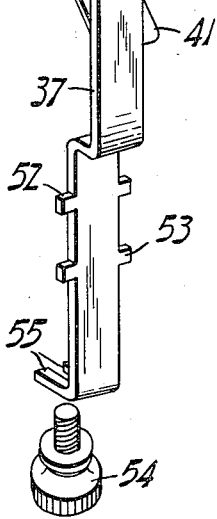
INVENTOR.
RAYMOND DEIBEL
BY
Bean, Brooks, Buckley & Bean.
ATTORNEYS United States Patent Office 2,771,784
Patented Nov. 27, 1956

2,771,784
ADJUSTABLE SNAP ACTION MECHANISM
Raymond Deibel, Cheektowaga, N. Y., assignor to Trico Products Corporation, Buffalo, N. Y.

Application March 2, 1953, Serial No. 339,639

4 Claims. (Cl. 74—97)

This invention pertains generally to the windshield cleaning art, and more particularly to a windshield cleaner of the type wherein a fluid pressure operated motor serves to move a wiper blade back and forth across a windshield to cleanse predetermined areas of the same.

Most present day windshield cleaners are preset at the factory or other place of installation so as to provide a predetermined fixed path of movement, or sweep, of the wiper blade. Thereafter the wiper blade will always traverse the same arc or area. If the driver of the vehicle should desire a different sweep, he is usually required to interchange various parts, or order and install a different unit, or otherwise make extensive alterations in the windshield cleaner.

Further, different types of vehicles present different windshield areas which must be cleansed if the driver is to have a clear field of vision. A sweep which is satisfactory on a small private passenger vehicle is usually not sufficient on a large truck, or bus. Thus it is necessary for the manufacturer to provide a large number of windshield cleaner units possessing different sweeps, or else he must provide a variety of interchangeable parts whereby the sweep of a particular windshield cleaner unit can be varied.

Thus it is apparent that in the present state of the windshield cleaning art, the problem of obtaining and providing for different sweeps is a very real one involving considerable expense to both the consumer and the supplier.

Accordingly, the primary object of this invention is to provide a windshield cleaner having an adjustable sweep.

Another object of this invention is to provide a windshield wiper motor incorporating means for quick manual adjustment of the sweep thereof.

It is a further object of this invention to provide a windshield wiper motor having means for manually adjusting the sweep thereof and which is composed of few parts, inexpensive to manufacture, easily manipulated, and reliable in operation.

A windshield cleaner according to the invention comprises a wiper motor having a rotatable drive shaft, means for reversing the direction of rotation of said drive shaft, and manually operable means for varying the degree of rotation of the drive shaft in each direction, whereby the sweep of the wiper can be varied by a manual adjustment. More specifically, in a preferred embodiment there is provided a valve for reversing the direction of rotation of the drive shaft, a first member for moving the valve, a second member rotatable with the drive shaft, and a third member adapted for lost-motion engagement by and with said second member and said first member, respectively, together with manually operable means for varying the degree of lost motion between said members.

The foregoing and other objects will become apparent in the ensuing detailed description, reference being made to the accompanying drawings forming a part thereof wherein:

Fig. 1 is an elevational view of a windshield cleaner mechanism according to the instant invention installed in operative position adjacent a windshield;

Fig. 2 is a fragmentary front elevational view of a windshield cleaner motor adjustable sweep mechanism according to the invention, with its cover plate removed;

Fig. 3 is a fragmentary view similar to Fig. 2, but showing the adjustable sweep mechanism in a different position for reversing the direction of wiper movement;

Fig. 4 is a fragmentary exploded view in perspective of the wiper motor of Fig. 2;

Fig. 5 is a fragmentary sectional view taken about on line V—V of Fig. 2; and

Fig. 6 is a fragmentary view similar to Fig. 2 but showing the mechanism thereof adjusted to provide a different sweep.

Referring to the drawings, and particularly to Fig. 1 thereof, the windshield cleaner is mounted adjacent a windshield 1, and comprises a wiper 2 carried at one end of a drive arm 3, the other end of which is mounted on one end of the shaft 4 of wiper motor 5. Wiper motor 5 comprises a fan-shaped housing 6 which encloses a vane or paddle 7 mounted near the other end of shaft 4. Housing 6 is closed by means of a cover 8 secured thereto by screws 9. Wiper motor 5 is operated by fluid pressure, in a manner to be described, to cause vane 7 and consequently wiper 2 to oscillate in a predetermined path.

Cover 8 has a raised portion 10 thereon through which extends a substantially longitudinal exhaust port 11 communicating with the top thereof and with an extension 12 in one side thereof. Extension 12 is adapted for connection with a source of vacuum, not illustrated, such as the intake manifold of the vehicle. A vertical port 13 extends from housing 6 into portion 10 to a transverse port 14 which extends therefrom to the side of portion 10. A second vertical port 15 extends from top to bottom of portion 10, and communicates with a second transverse port 16. A third vertical port 17 extends from the top of portion 10 to a third transverse port 18. A fourth vertical port 19 extends from exhaust port 11 to the top of portion 10. A parking port 20 extends longitudinally through cover 8 from a parking member, not illustrated, in housing 6, and vertically through portion 10 to the top thereof.

A slideable valve member 21 is mounted on top of portion 10, and is held thereon by means of a bracket 22 having bolts 23 securing it to the top of portion 10. Valve member 21 comprises an outer box-like member 24 surrounding a block 25 having recesses 26 and 27 therein. When valve member 20 is in running position, as illustrated in Fig. 2, recess 26 places ports 19 and 17 in communication, and recess 27 places ports 15 and 20 in communication. Valve member 21 is adapted to be moved, as by means of a manually operable Bowden wire 28, to a parked position wherein recess 26 places ports 17 and 15 in communication, and recess 27 places ports 20 and 11 in communication.

An arcuate hollow valve 29 is pivotally mounted on a bushing 30 in communication with port 18. Ports 31 and 32 on valve 29 are adapted to communicate alternately with ports 14 and 16 respectively. As is apparent from an inspection of Figs. 2 and 3 of the drawings, valve 29 is adapted to place either of ports 14 or 16 in communication with port 18, depending upon the position of valve 29, leaving the other of said ports open to the atmosphere, and the position of valve 29 is reversed by a kicker 33.

Kicker 33 comprises a plate journaled on shaft 4 for rotation thereon and having a cam-shaped upper edge adapted to bear against and urge upwardly whichever end of valve 29 is in the lowermost position. Two pins 34 and 35 are mounted on opposite ends of kicker 33.

A manually adjustable controller 37 is mounted on housing 6 in a manner to be described, and carries a bushing 38 on which is journaled an actuator 39 having inwardly extending flanges 40 and 41 at opposite ends thereof in alinement with pins 34 and 35, respectively. An arcuate member 36 is fitted on a serrated portion of shaft 4 for rotation therewith, being positioned thereon to avoid contact with pins 34 and 35. Member 36 is so shaped that as vane 7 nears the completion of its stroke in one direction, shaft 4 in turn causes member 36 to bear against one of the flanges 40, 41 on actuator 39, rotating it and causing the other flange thereof to bear against one of the pins 34, 35 on kicker 33. Then, as vane 7 completes its stroke, kicker 33 will be actuated to reverse the position of valve 29. In effect, then, actuator 39 is a floating member providing lost-motion connection between member 36 and kicker 33.

A snap action is imparted to kicker 33 as it passes a dead center position by energizing device 42 which comprises a coil spring 43 and a supporting link 44 therefor. Link 44 is guided by an anchor pin 45 carried on housing 6 and is pivotally connected by a pin 46 to the kicker 33 to cooperate therewith toggle-fashion. Spring 43 surrounds link 44 and extends between pin 45 and a plate 47 carried by link 44.

The operation of wiper motor 5 is as follows. Assuming the various parts to be in the position shown in Fig. 2, the right hand side of vane 7 is subject to exhaust action through ports 15, 16 and 32, valve 29, ports 18 and 17, recess 26, port 19 and exhaust port 11. At the same time, the left hand side of vane 7 is subject to atmospheric pressure through ports 13 and 14. The pressure differential thus created on opposite sides of vane 7 moves vane 7 to the right, counterclockwise as viewed in Fig. 2, imparting a corresponding stroke to wiper 2 through shaft 4.

As vane 7 moves to the right, shaft 4 rotates member 36 in the same direction and one edge thereof eventually abuts against flange 41 of actuator 39. Continued rotation of member 36 causes actuator 39 to rotate in the same counterclockwise direction until flange 40 abuts pin 34 on kicker 33 at which time kicker 33 is also rotated in the same counterclockwise direction until energizing device 42 moves past its dead center position to snap kicker 33 upwardly against the lower right hand end of valve 29, causing said valve to move to its other operative position as illustrated in Fig. 3. The various parts comprising the valve actuating members are so designed that valve 29 will reverse its position just as vane 7, and consequently wiper 2, reach the end of their stroke.

With valve 29 in the position shown in Fig. 3, the right hand side of vane 7 is subject to atmospheric pressure through ports 15 and 16, and the left hand side of vane 7 is subject to exhaust action through ports 13, 14 and 31, valve 29, ports 18 and 17, recess 26, port 19 and exhaust port 11. The pressure differential thus created on opposite sides of vane 7 will move vane 7 and consequently wiper 2 to the left or clockwise as viewed in Figs. 2 and 3. As vane 7 and wiper 2 near the end of this stroke, the other edge of member 36 will abut flange 40 of actuator 39 to rotate the latter in a clockwise direction. Upon continued movement in this direction flange 41 of actuator 39 will abut pin 35 and rotate kicker 33 in a clockwise direction until energizing device 42 passes its dead center position and causes kicker 33 to snap upwardly against the lower left hand end of valve 29 to again reverse the position thereof.

Vane 7 and wiper 2 will continue this oscillatory motion until Bowden wire 28 is actuated to move valve 21 to its park position. In this position, recess 27 places parking port 20 in communication with exhaust port 11, creating a continuous exhaust action on the right hand side of vane 7 as viewed in Fig. 2 and causing vane 7 and consequently wiper 2 to assume a parked position.

It is seen that the oscillatory motion of vane 7 and wiper 2 occurs between predetermined limits, and the arc traversed by these parts is known as the sweep. A windshield cleaner wiper motor according to the present invention incorporates means whereby this sweep can be readily varied by a simple manual adjustment, as follows.

Kicker 33, member 36, actuator 39, controller 37, and their associated parts are contained within raised chamber-defining portions 48 and 49, located on portion 10 of cover 8 and on housing 6, respectively. A cross-piece 50 extends across the lower part of portion 49 and has a groove 51 in the top thereof. Controller 37 fits within groove 51 for sliding movement on crosspiece 50 in a direction transverse thereto, with the end of shaft 4 being received within bushing 38, and shoulders 52 and 53 on controller 37 serve to abut crosspiece 50 and limit said sliding movement. A bolt 54 having a shoulder which engages and bears against a split inturned flange 55 on the lower end of controller 37 is threadedly engaged in the bottom wall of portion 49, as at 56. In this way, by rotating bolt 54 controller 37 can be moved to vary the axial position of actuator 39 with respect to shaft 4, and this in turn will vary the sweep of vane 7 and wiper 2, as described in detail hereinafter.

Controller 37 has a flange 57 at its upper end adapted to urge valve 29 against portion 10, and a cover 58 is provided for covering the chamber defined by portions 48 and 49, also serving to hold controller 37 in place therein. Openings 59 and 60 are provided in crosspiece 50 and in the lower wall of portion 49, whereby to place the chamber in communication with the atmosphere, and if desired a filter packing, not illustrated, can be placed between crosspiece 50 and the lower wall of raised portion 49.

The sweep of vane 7 and wiper 2 is adjusted as follows. If bolt 54 is turned in a direction to move controller 37 toward the top of the motor, actuator 39 will also be offset in that direction relative to shaft 4, as illustrated in Fig. 6. Since kicker 33 and member 36 maintain the same axis of rotation, this will increase the distance from member 36 and kicker pins 34 and 35 to flanges 40 and 41 on actuator 39. Thus, member 36 will have to travel further before it abuts either of flanges 40 and 41 on actuator 39, and said flanges must traverse a greater arc before contacting pins 34 and 35 on kicker 33. This means that shaft 4 oscillates through a larger arc, and consequently vane 7 and wiper 2 traverse an enlarged sweep as illustrated at 2″ in Fig. 1, which sweep is more adequate for a larger windshield 1′. It will be appreciated that the sweep of wiper 2 is positioned on the windshield by adjusting the position of arm 3 on shaft 4 as evidenced by the shift in position of path 2′ relative to path 2″.

Conversely, if bolt 54 is turned so as to lower controller 37, the flanges 40 and 41 on actuator 39 are brought closer to the actuating edges of member 36 and to kicker pins 34, 35, as illustrated in Figs. 2 and 3. Consequently, member 36 will travel a shorter distance before abutting flanges 40 and 41, and actuator 39 will traverse a diminished arc before flanges 40 and 41 contact pins 34 and 35. As a result, the sweep of vane 7 and wiper 2 will be reduced, as illustrated at 2′ in Fig. 1. Of course, controller 37 can be adjusted to any position between the limits defined by shoulders 52 and 53.

It is apparent that in this manner the sweep of wiper motor 5 is readily adjustable between wide limits. As an example, a variation of 65° was achieved in the sweep of one model. Thus, the present invention fully accomplishes its aforesaid objects, and does so in a new and useful manner.

Obviously, the present invention is not limited to the particular structural details disclosed and illustrated herein but includes such modifications thereof as might occur to those skilled in the art, and it is to be limited only by the scope of the appended claims.

Having fully disclosed this invention in what is believed to be a preferred embodiment thereof, and having completely described its mode of operation, what is is claimed as new is as follows:

1. In a fluid motor having a power driven shaft, reversing valve actuating means comprising, a first member, a second member secured to said shaft for movement therewith, and a third member extending between said first and second members for lost-motion engagement therewith, said third member being adjustable to vary the degree of lost-motion between said third member and each of said first and second members.

2. In a fluid motor having a rotating drive, reversing means therefor comprising, a first member, a second member secured on said rotating drive for movement therewith, an actuator element mounted for lost-motion engagement with and by said first and second members respectively, and means for adjusting the mounting of said actuator element whereby to vary the amount of lost motion between said element and both of said members.

3. In a wiper motor, a drive shaft, drive shaft reversing means, a kicker element, an actuator, mounting means supporting said actuator for lost-motion engagement with said kicker element, a drive member responsive to rotation of said shaft for movement into lost-motion engagement with said actuator, and means for moving said mounting means so as to adjust the lost motion between said actuator and both said kicker element and said drive member.

4. Automatic motor reversing mechanism comprising, a rotating drive, an actuator element, a drive member movable in response to rotation of said drive, a floating member positioned for lost-motion engagement by and with said drive member and said actuator element respectively, and means for adjusting the position of said floating member relative to said drive member and said actuator element to vary the degree of lost motion between said floating member and each of said drive member and said actuator element.

References Cited in the file of this patent

UNITED STATES PATENTS

| | | |
|---|---|---|
| 1,849,327 | Hueber | Mar. 15, 1932 |
| 2,075,959 | Previti | Apr. 6, 1937 |
| 2,177,052 | Blough | Oct. 24, 1939 |
| 2,404,747 | Sacchini | July 23, 1946 |
| 2,523,992 | Hess | Sept. 26, 1950 |
| 2,696,805 | Krohm | Dec. 14, 1954 |